United States Patent [19]

Berrios

[11] Patent Number: 5,483,787
[45] Date of Patent: Jan. 16, 1996

[54] PIVOTING AUXILIARY BLADE APPARATUS FOR LAWN MOWER

[76] Inventor: Joseph E. Berrios, 975 NW. 114th Ave., Coral Springs, Fla. 33071

[21] Appl. No.: 291,686

[22] Filed: Aug. 17, 1994

Related U.S. Application Data

[63] Continuation-in-part of Ser. No. 109,327, Aug. 19, 1993.
[51] Int. Cl.⁶ .................................................. A01D 35/00
[52] U.S. Cl. ........................... 56/10.1; 56/11.6; 56/320.1
[58] Field of Search .................................... 56/11.6, 13.5, 56/13.6, 13.7, 16.9, 17.1, 255, 320.1, DIG. 10, DIG. 17, DIG. 20, DIG. 22

[56] References Cited

U.S. PATENT DOCUMENTS

| | | | |
|---|---|---|---|
| 4,920,733 | 5/1990 | Berrios | 56/10.9 |
| 5,012,632 | 5/1991 | Kuhn et al. | 56/11.6 |
| 5,177,942 | 1/1993 | Hager et al. | 56/11.6 |
| 5,249,411 | 10/1993 | Hake | 56/11.6 |

*Primary Examiner*—Ramon S. Britts
*Assistant Examiner*—Pamela A. O'Connor
*Attorney, Agent, or Firm*—Frank L. Kubler

[57] ABSTRACT

An auxiliary blade apparatus for connecting to a lawn mower having an engine, a mower blade, a mower deck over the mower blade having side edges, a mower drive shaft extending from the mower blade to a mower blade drive element drivably connected to the engine, the auxiliary blade apparatus includes an auxiliary blade support structure pivotally connected to the lawn mower, to pivot upward to permit the mower to pass through a narrow gate in a yard fence, and downward to extend the width of the cutting area of the mower to widen the path the mower can cut, and an auxiliary blade fastened to an auxiliary drive shaft extending through the auxiliary blade support structure and fastened to an auxiliary drive element connected to the mower blade drive element. The auxiliary blade support structure preferably includes an auxiliary deck pivotally joined to one of the mower deck side edges. Where the mower drive element includes a mower drive pulley and a mower drive belt riding on the mower pulley and drivably connected to the mower engine, and where the auxiliary drive element includes an auxiliary drive pulley and an auxiliary drive belt riding on the auxiliary drive pulley, the apparatus includes a double pulley for replacing the mower drive pulley to simultaneously carry the mower drive belt and the auxiliary drive belt.

9 Claims, 6 Drawing Sheets

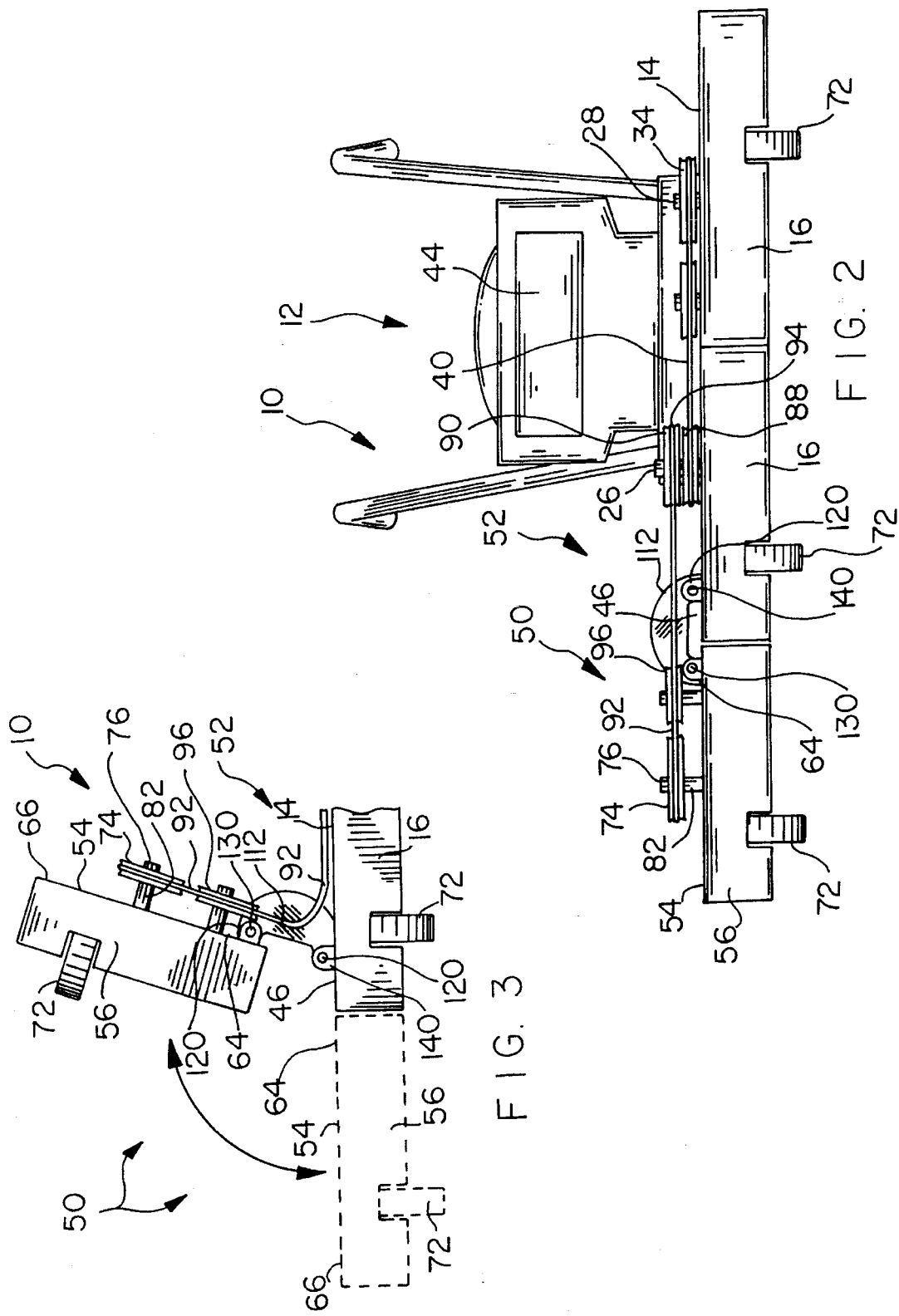

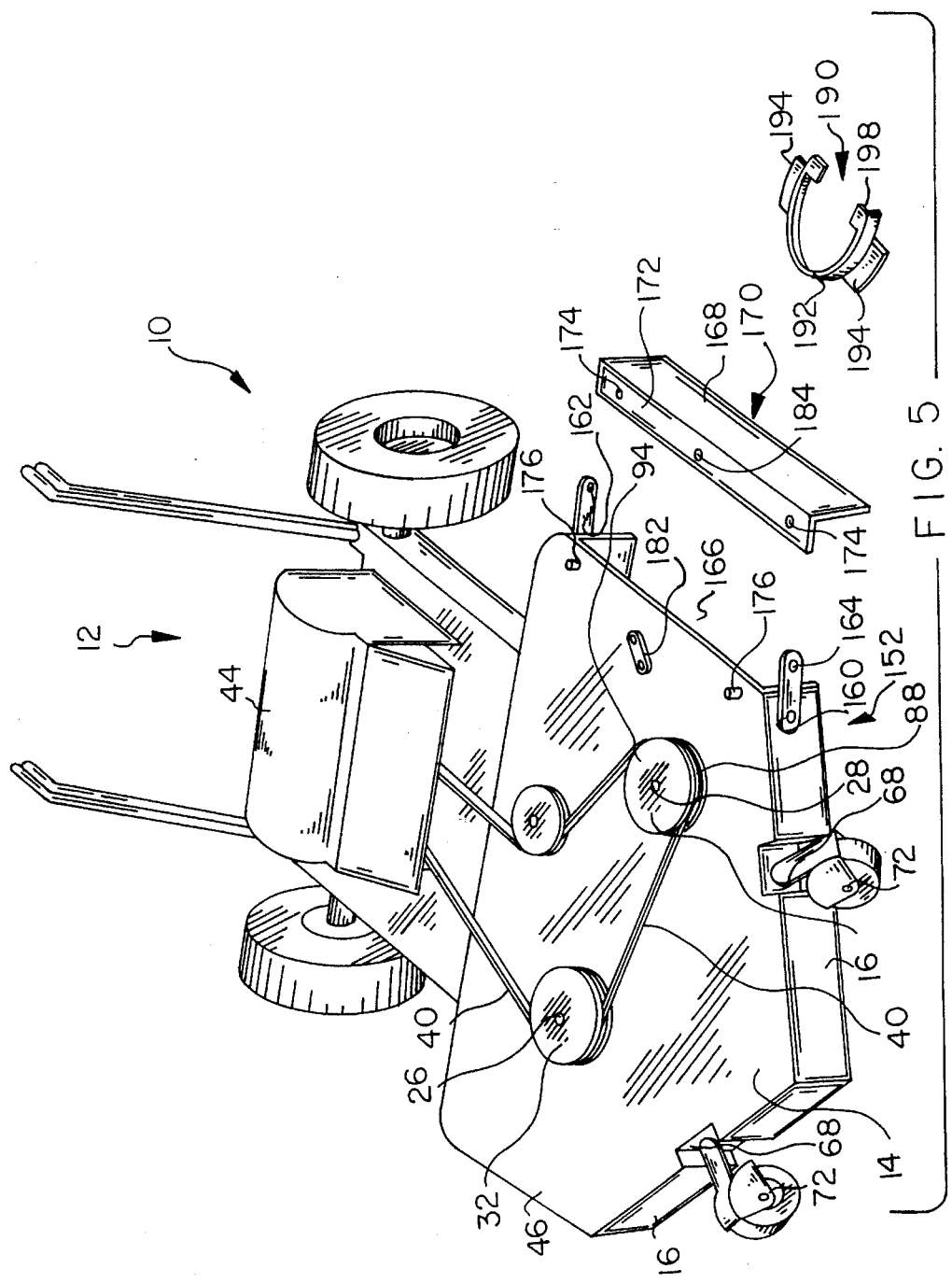

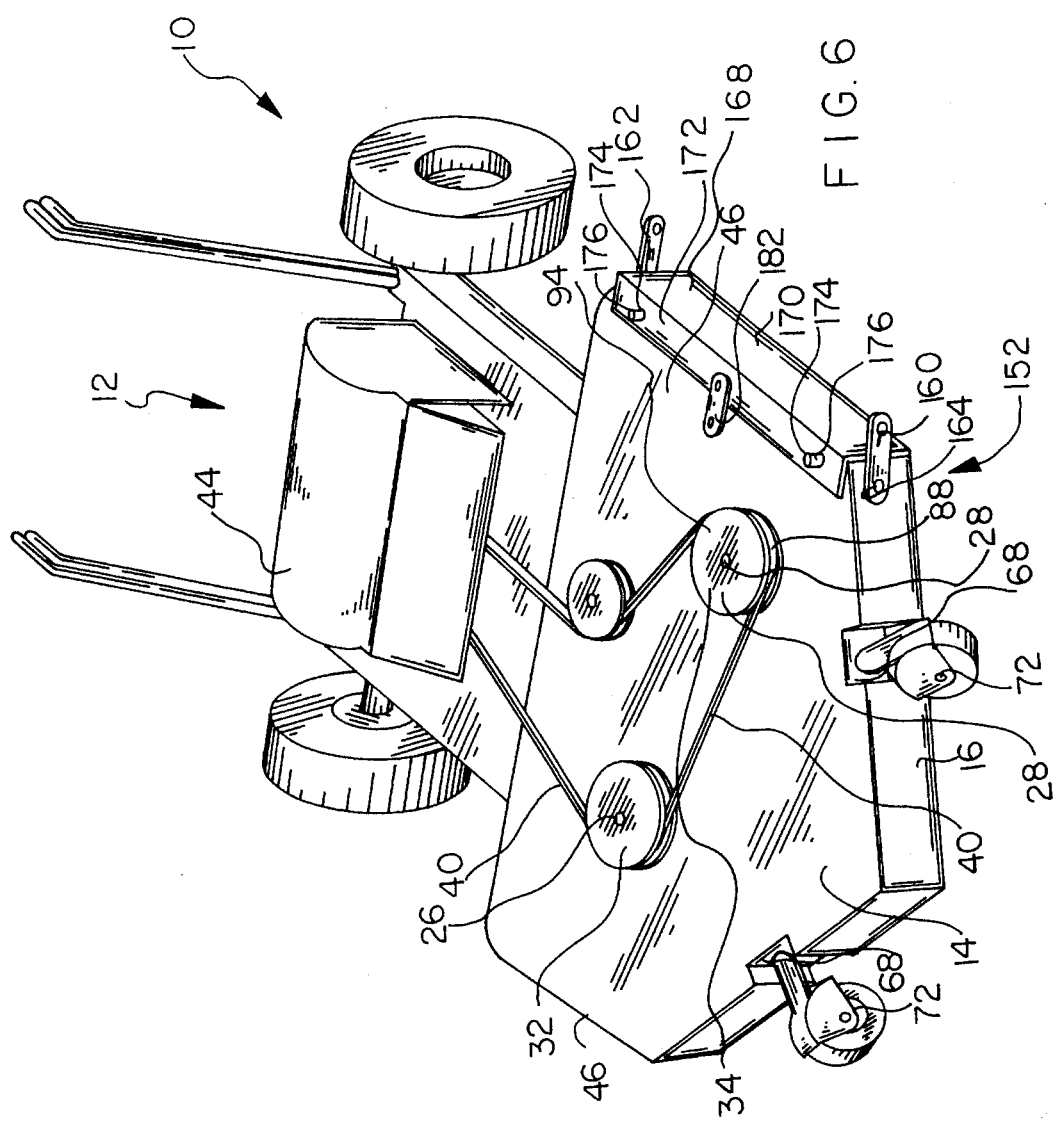

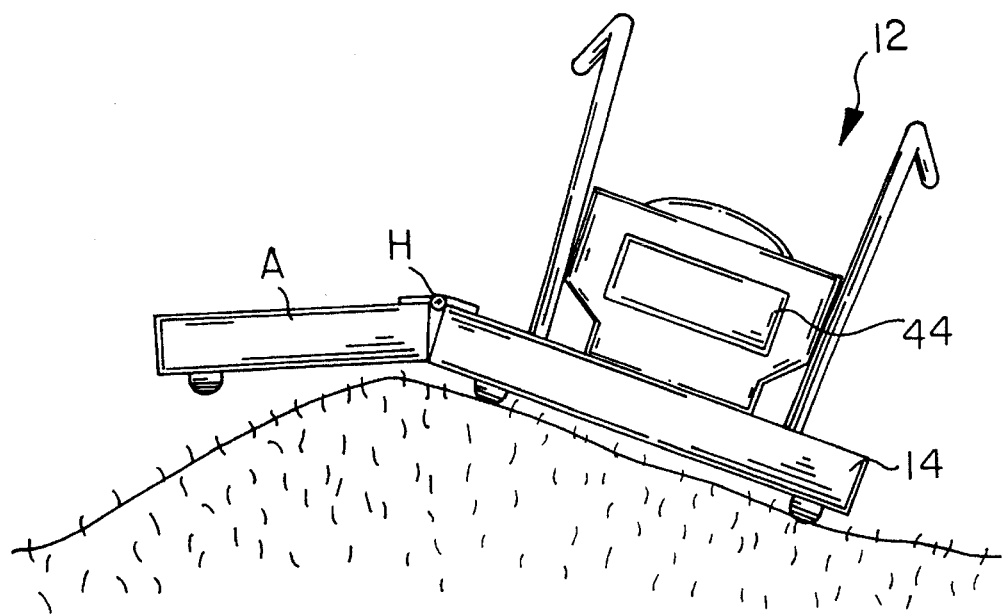
PRIOR ART  FIG. 7
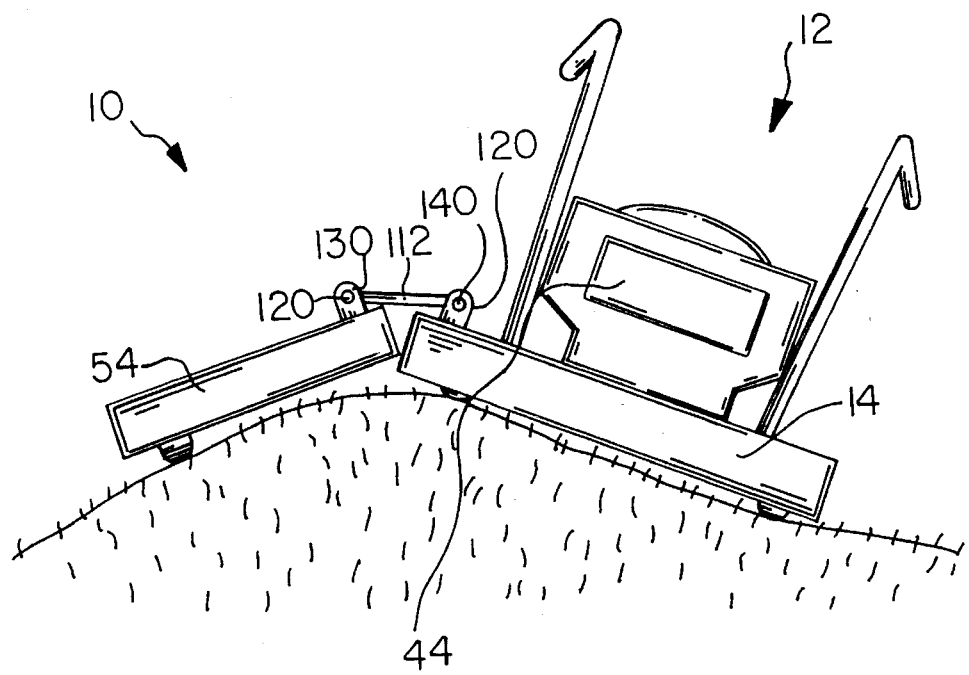
FIG. 8

PIVOTING AUXILIARY BLADE APPARATUS FOR LAWN MOWER

This application is a continuation-in-part of application Ser. No. 08/109,327, filed on Aug. 19, 1993.

BACKGROUND OF THE INVENTION

1. Field of the Invention

The present invention relates generally to the field of accessories for lawn mowers. More specifically, it relates to an auxiliary blade apparatus for use on lawn mowers having a mower deck covering at least one rotary mower blade and a mower drive shaft joining the at least one rotary mower blade to a conventional mower drive pulley connected by a mower drive belt to a mower engine pulley. The auxiliary blade apparatus includes a blade assembly having an auxiliary deck for mounting to the side of the mower deck on hinged linkages. These hinged linkages permit the auxiliary deck to pivot upward to a tiled position over the mower deck to permit the mower to pass through a conventional gate in a yard fence, and to pivot downward to become substantially co-planar with the mower deck to widen the mower cutting path so that the yard can be mowed in fewer passes and less time. A pair of swivel-mounted wheels are attached to the pivoting free end of the auxiliary deck for supporting the blade assembly during mowing. An auxiliary drive pulley is mounted above the auxiliary deck on an auxiliary drive shaft. A rotary auxiliary blade is mounted on the auxiliary drive shaft underneath the auxiliary deck. The apparatus also includes a double drive pulley replacing one of the original mower single drive pulleys, the mower belt riding on one pulley portion of the double drive pulley, an auxiliary drive belt riding on the auxiliary drive pulley and on the other pulley portion of the double drive pulley. A spring-loaded belt tensioning pulley bears against the auxiliary drive belt between the auxiliary drive pulley and the double drive pulley. Inventive belt guards are provided to hold the auxiliary drive belt on the pulleys when the auxiliary deck is pivoted upward. The auxiliary deck can also be removed from the mower deck and the opening in the deck flange covered by an inventive cover plate assembly.

2. Description of the Prior Art

There have long been rotary lawn mowers for cutting the grass surrounding homes and businesses. Some of these mowers are designed primarily for use by professional lawn maintenance workers. These are wider than the conventional mower for home use, having two and often three rotary blades beneath a single mower deck. This sort of mower is well illustrated in the patent issued to Berrios, U.S. Pat. No. 4,920,733, on May 1, 1990. The wide cutting path of these mowers saves the maintenance worker valuable time by reducing the number of passes he must make to cover a given yard area. Yet the wide mower can be awkward or impossible to maneuver through a typical gate in a yard fence. The worker may risk injury by trying to lift and angle the mower through the gate. The only alternative has been to use a narrower mower and spend much more time doing the job.

It is thus an object of the present invention to provide a lawn mower auxiliary blade apparatus which does not hinder the passage of a mower through a gate and yet widens the cutting path of the mower beyond the gate width.

It is another object of the present invention to provide such an apparatus which can be attached to a conventional lawn mower, or provided with a conventional lawn mower as original equipment, and which can be tilted up to a compact position over the mower deck without drive belt disengagement from drive pulleys.

It is another object of the present invention to provide such an apparatus which effectively combines large and small lawn mowers in one mower, so that the purchase and storage costs of a second mower are saved.

It is still another object of the present invention to provide such an apparatus which is removable from the mower so that the mower can be used independently as a small mower and a cover plate for covering the exposed opening in the mower deck flange.

It is still another object of the present invention to provide such an apparatus which is simple, sturdy and reliable, and easy to install and maintain.

It is finally an object of the present invention to provide such an apparatus which is inexpensive to manufacture.

SUMMARY OF THE INVENTION

The present invention accomplishes the above-stated objectives, as well as others, as may be determined by a fair reading and interpretation of the entire specification.

An auxiliary blade apparatus is provided for connecting to a lawn mower having an engine, a mower blade, a mower deck over the mower blade having side edges, a mower drive shaft extending from the mower blade to a mower blade drive element drivably connected to the engine, the auxiliary blade apparatus including an auxiliary blade support structure pivotally connected to the lawn mower, to pivot upward to permit the mower to pass through a narrow gate in a yard fence, and downward to extend the width of the cutting area of the mower to widen the path the mower can cut, and an auxiliary blade fastened to an auxiliary drive shaft extending through the auxiliary blade support structure and fastened to an auxiliary drive element connected to the mower blade drive element. The auxiliary blade support structure preferably includes an auxiliary deck pivotally joined to one of the mower deck side edges. The apparatus preferably includes a deck support wheel attached to the auxiliary deck for supporting the auxiliary deck when pivoted downward. The auxiliary deck is preferably pivotally joined to one of the mower deck edges with a hinge assembly including a connecting member having a first end and a second end extending between the mower deck and the auxiliary deck, the connecting member first end being attached to the mower deck with a hinge structure and the connecting member second end being attached to the auxiliary deck with a hinge structure, for permitting the auxiliary deck to float freely relative to the mower deck to independently follow ground irregularities during mowing.

Where the mower drive element includes a mower drive pulley and a mower drive belt riding on the mower pulley and drivably connected to the mower engine, and where the auxiliary drive element includes an auxiliary drive pulley and an auxiliary drive belt riding on the auxiliary drive pulley, the apparatus includes a double pulley for replacing the mower drive pulley to simultaneously carry the mower drive belt and the auxiliary drive belt. The apparatus also preferably includes a belt tensioning mechanism attached to the auxiliary blade support structure for bearing against the auxiliary drive belt between the auxiliary drive pulley and the double drive pulley for maintaining tension in the auxiliary drive belt.

A complete lawn mower is alternatively provided which includes an mower engine, a mower blade, a mower deck over the mower blade having side edges, a mower drive shaft extending from the mower blade to mower blade drive element drivably connected to the mower engine, and an auxiliary blade apparatus including an auxiliary blade support structure pivotally connected to the lawn mower, to pivot upward to permit the mower to pass through a narrow gate in a yard fence, and downward to extend the width of the cutting area of the mower to widen the path the mower can cut, and an auxiliary blade fastened to an auxiliary drive shaft extending through the auxiliary blade support structure and fastened to the auxiliary drive element connected to the mower blade drive element.

A walk-behind lawn mower is provided including an engine, a mower blade having a mower blade drive assembly, a mower main deck over the mower blade having side edges, a mower drive shaft extending from the mower blade to the mower blade drive assembly drivably connected to the engine, an auxiliary blade apparatus including a auxiliary blade support assembly pivotally connected to the mower deck, to pivot upward to permit the mower to pass through a narrow gate in a yard fence, and downward to extend the width of the cutting area of the mower to widen the path the mower can cut, an auxiliary blade fastened to an auxiliary drive shaft extending through the auxiliary blade support assembly and fastened to auxiliary drive assembly connected to the mower blade drive assembly. The apparatus may additionally or alternatively include a hinge assembly by which the auxiliary deck is pivotally joined to one of the mower deck edges including a connecting member having a first end and a second end extending between the mower deck flange and the auxiliary deck flange, the connecting member first end being attached to the mower deck with a pin and the connecting member second end being attached to the auxiliary deck with a pin, so that the first and second ends of the connecting member pivot during mower use to permit the auxiliary deck to float freely relative to the mower main deck to independently follow ground irregularities during mowing. The apparatus may also include an auxiliary deck connection opening cover plate, and structure for securing the cover plate over the auxiliary deck connection opening. The cover plate preferably includes a cover flange and a substantially perpendicular mounting flange, the mounting flange having a stud receiving opening, and the mower deck having an upwardly projecting stud for insertion into the stud receiving opening. The apparatus may also include a belt guard including a pulley edge cover secured adjacent at least one of the drive pulley edges, and a retaining flange extending across one belt side for retaining the drive belt on the pulley when the auxiliary deck is pivoted relative to the mower deck.

BRIEF DESCRIPTION OF THE DRAWINGS

Various other objects, advantages, and features of the invention will become apparent to those skilled in the art from the following discussion taken in conjunction with the following drawings, in which:

FIG. 2 is a front plan view of the apparatus and lawn mower of FIG. 1

FIG. 3 is a partial front plan view showing the inventive blade assembly in the up position ready to pass through a gate or other narrow passage, and also showing the blade assembly in broken lines in the down position ready for mowing.

FIG. 5 is a perspective view as in FIG. 4, with the auxiliary deck removed to expose the mower deck flange opening, both auxiliary deck elongate plate hinges, and a separated auxiliary drive belt guard and mower deck flange opening cover.

FIG. 6 is a perspective view as in FIG. 5, except that the deck flange opening cover is attached to the mower deck.

FIG. 7 is a front view of a PRIOR ART auxiliary blade apparatus A connected to a lawn mower while the mower rides over a side of a small hill or ridge. Note that the conventional hinge H structure does not permit the auxiliary blade to make full contact with and mow the other side of the hill or ridge. The belts are omitted to provide a clearer view of the prior art hinge H.

FIG. 8 is a front view of the inventive auxiliary blade apparatus connected to a lawn mower while the mower rides over the side of a small hill or ridge. Note that the inventive double hinged connecting link permits the auxiliary blade to ride closely over and mow grass on the other side of the hill or ridge. The belts are omitted to provide a clearer view of the inventive hinge structure.

DETAILED DESCRIPTION OF THE PREFERRED EMBODIMENTS

Figure 1:
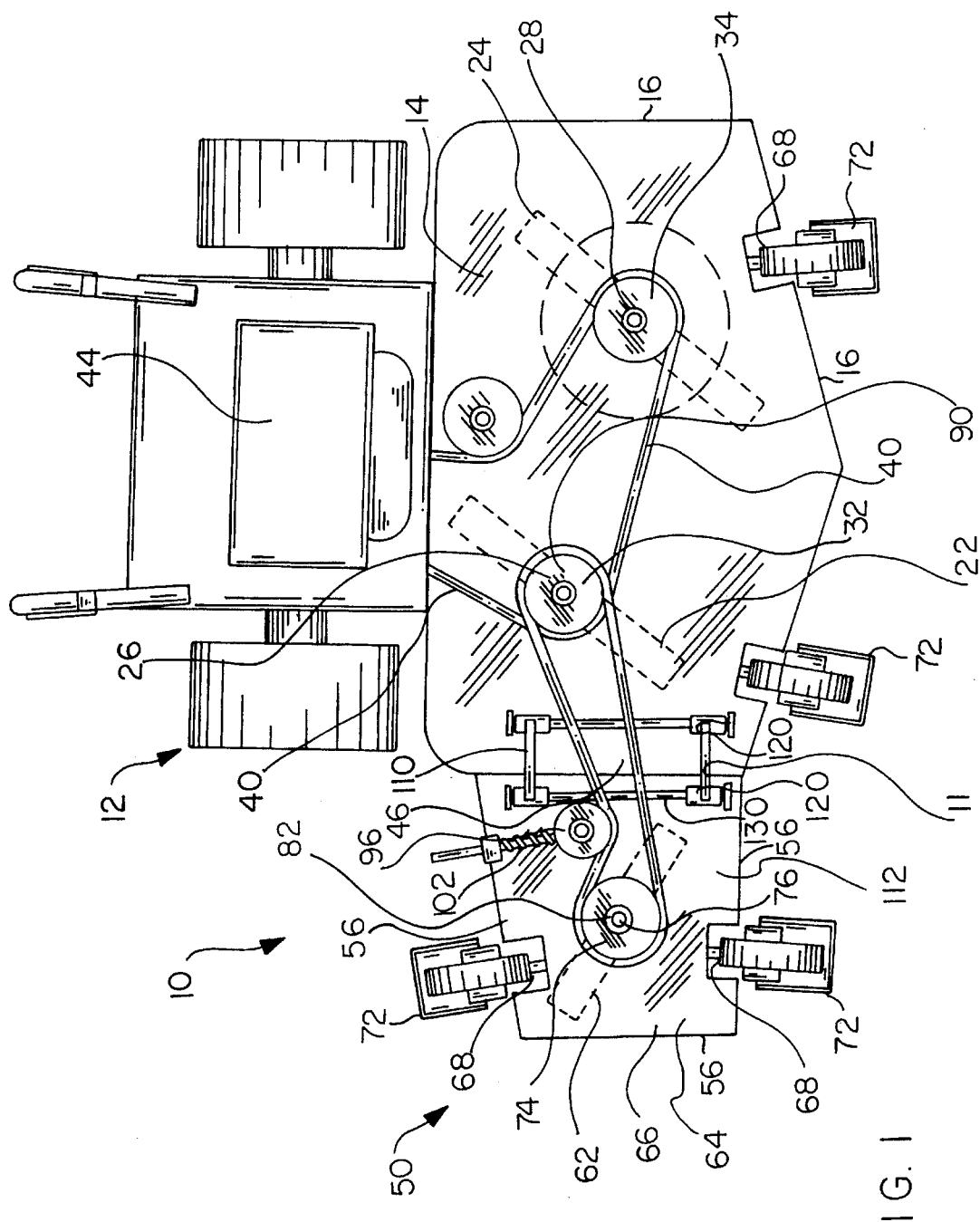
FIG. 1 is a top plan view of the inventive apparatus connected to a conventional lawn mower, the blade assembly shown in the down position ready for mowing.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various Figures are designated by the same reference numerals.

First Preferred Embodiment

Referring to FIGS. 1–3, a removable auxiliary blade apparatus 10 is disclosed for use on a conventional rotary lawn mower 12. Apparatus 10 is intended only for the walk-behind style of rotary lawn mower 12 used by lawn maintenance professionals. Mower 12 typically has a mower deck 14 with a downwardly extending peripheral flange 16, covering two rotary mower blades 22 and 24. Blades 22 and 24 are mounted on mower drive shafts 26 and 28, respectively, which extend upward through mower deck 14 and are secured to conventional mower drive pulleys 32 and 34, respectively. A single mower drive belt 40 transfers power from the mower engine 44 to pulleys 32 and 34.

Apparatus 10 includes an auxiliary blade assembly 50 which is connected with a hinge assembly 52 to a side edge 46 of mower deck 14. Blade assembly 50 pivots up to a position tilted over mower deck 14 to permit the mower 12 to pass through a narrow gate in a yard fence. Then assembly 50 pivots down to laterally extend the cutting path of mower 12 to minimize the number of passes required to mow a given lawn area, and to extend the cutting path away from the operator to permit cutting under low tree branches and other obstacles.

Assembly 50 includes an auxiliary deck 54, having a peripheral flange 56, covering an auxiliary blade 62. Auxiliary deck 54 has a connected side edge 64 which is joined by hinge assembly 52 to mower deck 14 side edge 46, and a free side edge 66 opposite connected side edge 64. A pair of swivel-mounted wheel assemblies 72 of a type commonly used on lawn mowers are connected to free side edge 66 to support blade assembly 50 in the down position. Wheel assemblies 72 fit into deck recesses 68. An auxiliary drive pulley 74 is mounted on a first end 76 of an auxiliary drive shaft 82 extending through auxiliary deck 54. A conventional bearing or bushing structure (not shown) rotatably joins auxiliary drive shaft 82 to auxiliary deck 54. Auxiliary blade 62 is mounted to a second end 86 of auxiliary drive shaft 82.

A double drive pulley 90 replaces original mower drive pulley 32, and mower drive belt 40 rides on the lower pulley portion 88 of double drive pulley 90. An auxiliary drive belt 92 rides on and drivably connects auxiliary drive pulley 74 and the top pulley portion 94 of double drive pulley 90. An auxiliary belt tensioning pulley 96 of conventional design is mounted on a shaft 102 slidably connected to auxiliary deck 54. Shaft 102 is biased with a coil spring 104 so that tensioning pulley 96 bears against and maintains tension in auxiliary drive belt 92.

Hinge assembly 52 preferably includes two linkage members 110 and 112 extending between and hingedly connecting decks 14 and 54, each linkage member 110 and 112 having a pin opening in each end. A pair of spaced apart flange protrusions 120 extends from each deck 14 and deck 54. Each flange protrusion 120 in a given pair having a pin opening aligned with a pin opening in the other flange protrusion 120 in the pair. Heavy hinge pins 130 and 140 extend through the pin openings in linkage members 110 and 112 and flange protrusions 120 to pivotally connect flange protrusions 120 on each deck 14 and 54 to opposing ends of linkage members 110 and 112. See FIGS. 1 and 2. Linkage members 110 and 112 pivot at flange protrusions 120 on mower deck 14 to permit auxiliary deck 54 to pivot over mower deck 14. Linkage members 110 and 112 pivot at flange protrusions 120 on auxiliary deck 54 to permit auxiliary deck 54 to tilt sharply and freely relative to mower deck 14 to closely follow ground irregularities during mowing independently of mower deck 14.

It is contemplated that for certain applications an apparatus 10 may be provided on both sides of a mower 12. It is also contemplated that for certain applications apparatus 10 may include more than one blade or may be restructured to hold a cylindrical blade. It is noted that both mower blades 22 and 24 are laterally offset from the center of mower deck 14. This arrangement places one of blades 22 or 24 at the composite center of the mower deck assembly when a single auxiliary deck 54 is attached to one side of mower deck 14.

Second Preferred Embodiment

Figure 4:
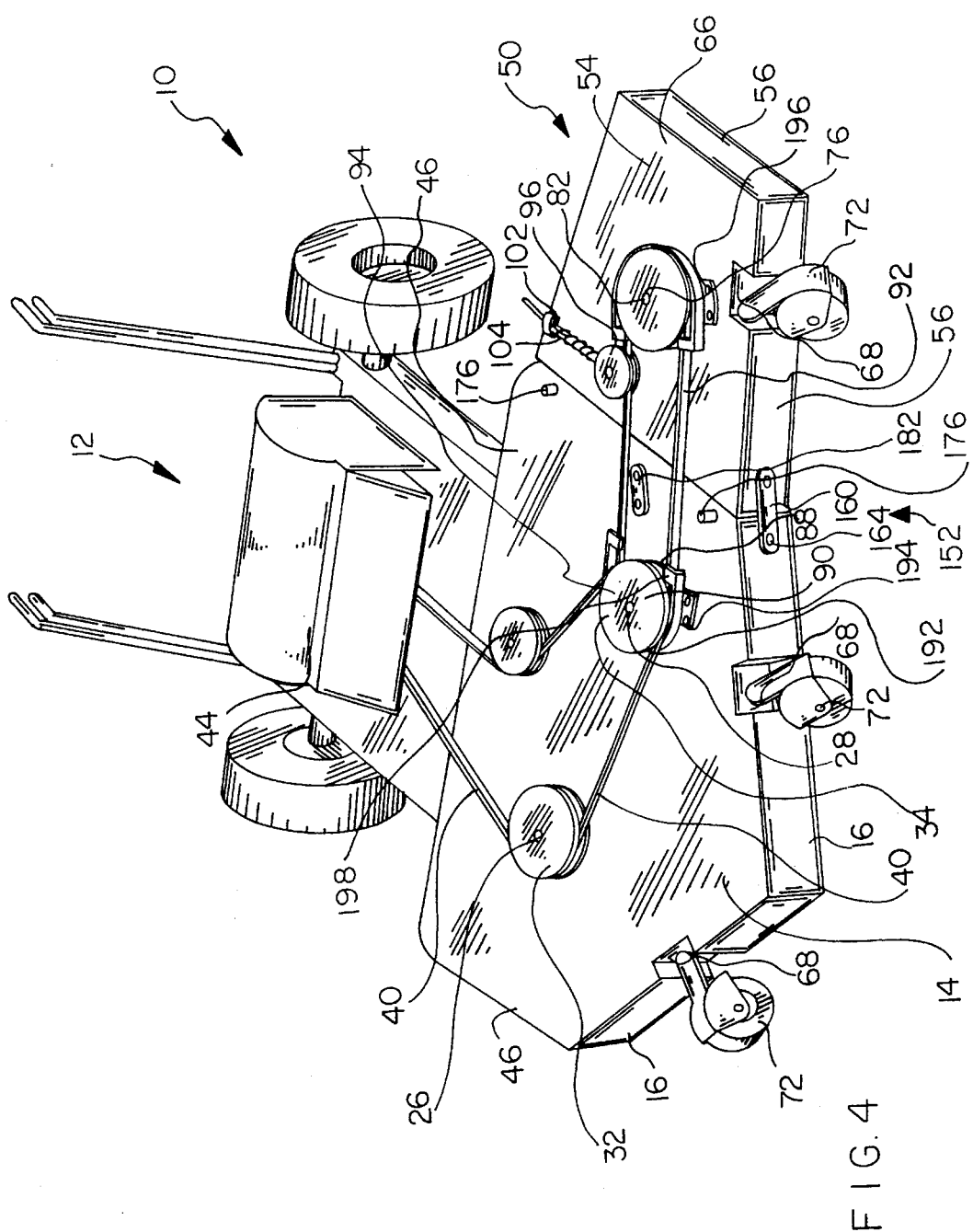
FIG. 4 is a perspective view of the mower, mower deck and auxiliary deck, with the auxiliary deck mounted on the operator's left side. The alternative elongate plate connecting hinge is illustrated, as well as the inventive auxiliary drive belt guard.

Referring to FIGS. 4, 5 and 6, a second embodiment is provided which is essentially like the first, with the following differences. First, as an optional matter of individual preference, the auxiliary deck 54 is mounted on the opposite side of mower deck 14 from that shown in FIGS. 1, 2 and 3. An auxiliary deck connection 165 opening remains on the original auxiliary deck 54 side, and in this instance only, a mower deck flange opening 166 is provided in mower deck flange 16. Second, hinge assembly 52 is replaced with hinge assembly 152. Hinge assembly 152 includes two elongate plates 160 or 162, each having a bolt or other single fastener 164 in each plate 160 or 162 end pivotally securing plate 160 or 162 to mower deck 14 flange 16. This alternative design is analogous to hinge assembly 52 in that two spaced apart pivot points joined by a connecting linkage permit auxiliary deck 54 to pivot over and above mower deck 14 and to float freely during use relative to deck 14. A fastener 164 at one end of each plate 160 and 162 is removed to disconnect auxiliary deck 54. Hinge assembly 152 is sufficiently stable that only one wheel assembly 72 is required to support auxiliary deck 54.

Next, where auxiliary deck 54 is removed, it is desired that the exposed opening 166 in mower deck flange 16 be covered. so that debris escapes primarily through the original debris expulsion opening mentioned above. See FIG. 5. Therefore, a removable mower deck flange cover plate 170 is provided which removably attaches to mower deck 14 over opening 166. The mower deck flange cover plate 170 is preferably a segment of angle iron, one side 168 of which covers opening 166 and the other side of which constitutes a cover flange 172 for securing cover plate 170 to mower deck 14. Cover flange 172 has two end holes 174 which receive studs 176 projecting upward from mower deck 14. Once cover flange 172 is fitted over studs 176, a pivotally mounted arm 182 is rotated over flange 172. Arm 182 hold cover flange 172 on studs 176. A spring-loaded ball of conventional design snaps into a central opening 184 in cover flange 172. See FIG. 5. This construction makes attachment and removal of cover plate 170 fast and easy. All one need do is fit cover plate holes 174 over studs 176, and then rotate arm 182. To remove cover plate 170, one rotates arm 182 off flange 172 and lifts cover plate 170 off studs 176 and away from mower deck 14.

Another preferred feature is a belt guard 190 shown separately in FIG. 4. Belt guard 190 is designed to hold auxiliary drive belt 92 on pulleys 74 and 90 when auxiliary deck 54 is pivoted up and over mower deck 14. A C-shaped strip portion 192 has two anchoring retaining flange means 194, one on each outer side, through which screws 196 are inserted to removably secure strip portion 192 to mower or auxiliary deck 14 or 54, respectively. See FIG. 4. A tab portion 198 protrudes inwardly from each end of the C-shaped strip portion 192 and over belt 92. As a result, strip portion 192 holds belt 92 on pulleys 74 and 90, while tab portions 198 retain belt 92 against bending within the pulley 74 or 90 tracks.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. In combination, an auxiliary blade apparatus and a walk behind lawn mower comprising an engine, a mower blade, a mower deck over said mower blade having side edges, a mower drive shaft extending from said mower blade to mower blade drive means drivably connected to said engine, said combination, comprising:

an auxiliary deck pivotally connected to said lawn mower, to pivot upward to permit said mower to pass through a narrow gate in a yard fence, and downward to extend the width of the cutting area of said mower to widen the path said mower can cut, an auxiliary blade fastened to an auxiliary drive shaft extending through said auxiliary deck and fastened to auxiliary drive means connected to said mower blade drive means, wherein said auxiliary deck is pivotally joined to said one of said mower deck edges with a hinge assembly comprising:

a connecting member having a first end and a second end extending between said mower deck and said auxiliary deck, said connecting member first end being attached to said mower deck with a first hinge means and said connecting member second end being attached to said auxiliary deck with a second hinge means, such that said first and second ends of said connecting member pivot during mower use to permit said auxiliary deck to move relative to said mower deck.

2. The apparatus of claim 1, wherein said auxiliary blade support means comprises an auxiliary deck pivotally joined to one of said mower deck side edges.

3. The apparatus of claim 2, additionally comprising:

a deck support wheel attached to said auxiliary deck for supporting said auxiliary deck when pivoted downward.

4. The apparatus of claim 1, wherein said mower drive means comprises a mower drive pulley and a mower drive belt riding on said mower pulley and drivably connected to said mower engine, and wherein said auxiliary drive means comprises an auxiliary drive pulley and an auxiliary drive belt riding on said auxiliary drive pulley, additionally comprising:

a double pulley for replacing said mower drive pulley to simultaneously carry said mower drive belt and said auxiliary drive belt.

5. The apparatus of claim 4, additionally comprising:

belt tensioning means attached to said auxiliary blade support means for bearing against said auxiliary drive belt between said auxiliary drive pulley and said double drive pulley for maintaining tension in said auxiliary drive belt.

6. In combination, an auxiliary blade apparatus and a walk behind lawn mower comprising an engine, a mower blade, a mower deck over said mower blade having side edges, said mower deck having a mower deck flange, a mower drive shaft extending from said mower blade to mower blade drive means drivably connected to said engine, said combination, comprising:

an auxiliary deck pivotally connected to said lawn mower, to pivot upward to permit said mower to pass through a narrow gate in a yard fence, and downward to extend the width of the cutting area of said mower to widen the path said mower can cut, said auxiliary deck having an auxiliary deck flange, an auxiliary blade fastened to an auxiliary drive shaft extending through said auxiliary deck and fastened to auxiliary drive means connected to said mower blade drive means, wherein said auxiliary deck is pivotally joined to said one of said mower deck edges with a hinge assembly comprising a connecting member having a first end and a second end extending between said mower deck flange and said auxiliary deck flange, said connecting member first end being attached to said mower deck with a first pin means and said connecting member second end being attached to said auxiliary deck with a second pin means, such that said first and second ends of said connecting member pivot during mower use to permit said auxiliary deck to move relative to said mower deck.

7. In combination, an auxiliary blade apparatus and a lawn mower comprising an engine, a mower blade, a mower deck over said mower blade having a mower deck flange, said mower deck flange having a mower deck flange opening and an auxiliary deck connection opening, a mower drive shaft extending from said mower blade to mower blade drive means drivably connected to said engine, said combination, comprising:

an auxiliary deck pivotally connected to said mower deck, to pivot upward to permit said mower to pass through a narrow gate in a yard fence, and downward to extend the width of the cutting area of said mower to widen the path said mower can cut, an auxiliary blade fastened to an auxiliary drive shaft extending through said auxiliary deck and fastened to auxiliary drive means connected to said mower blade drive means, a mower deck connection opening cover plate, means for securing said cover plate over said mower deck flange opening when said auxiliary deck is removed from said mower deck.

8. The apparatus of claim 7, wherein said cover plate comprises a cover flange and a substantially perpendicular mounting flange, said mounting flange having a stud receiving opening, and said mower deck having an upwardly projecting stud for insertion into said stud receiving opening.

9. In combination, an auxiliary blade apparatus and a lawn mower comprising an engine, a mower blade, a mower deck over said mower blade having side edges, a mower drive shaft extending from said mower blade to mower blade drive means drivably connected to said engine and comprising a double drive pulley having a pulley edge and an auxiliary drive belt having two belt sides and an outer belt face and an inner belt face, said auxiliary blade apparatus comprising:

an auxiliary deck pivotally connected to said lawn mower, to pivot upward to permit said mower to pass through a narrow gate in a yard fence, and downward to extend the width of the cutting area of said mower to widen the path said mower can cut, an auxiliary blade fastened to an auxiliary drive shaft extending through said auxiliary blade support means and fastened to auxiliary drive means comprising an auxiliary drive pulley having a drive pulley edge and belt means and connected to said mower blade drive means, belt guard means comprising tab portions means secured adjacent to at least one said drive pulley edge, and retaining flange means extending across one said belt side for retaining said drive belt on said drive pulley when said auxiliary deck is pivoted relative to said mower deck.

* * * * *